Jan. 2, 1940.　　　R. M. STOWE　　　2,185,904
TUBULAR FRAME
Filed July 16, 1937　　　2 Sheets-Sheet 1

Inventor
Rolland M. Stowe
By Richmond S. Hayes
His Attorney

Jan. 2, 1940.  R. M. STOWE  2,185,904
TUBULAR FRAME
Filed July 16, 1937  2 Sheets-Sheet 2
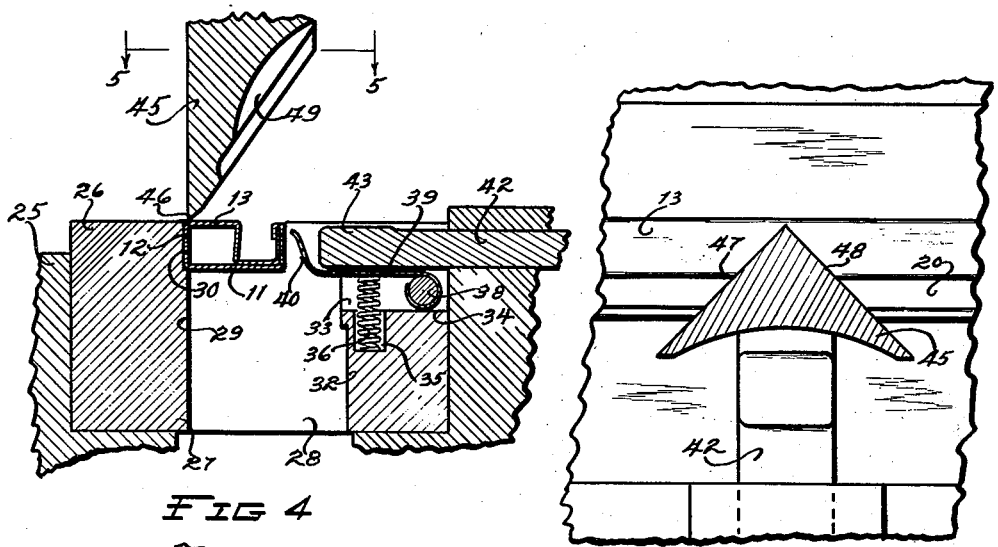
Inventor
Rolland M. Stowe
By Richmond S. Hayes
His Attorney Patented Jan. 2, 1940

2,185,904

UNITED STATES PATENT OFFICE 2,185,904

TUBULAR FRAME

Rolland M. Stowe, Corry, Pa., assignor to Corry-Jamestown Manufacturing Corporation, Corry, Pa., a corporation of New York Application July 16, 1937, Serial No. 154,022

5 Claims. (Cl. 113—116)

This invention relates to metallic screen frames and a method for producing a single piece screen frame from a section of metallic tubing.

Prior to this invention tubular screen frames have been formed from rails which, being mitered at their ends, were placed in abutment and secured by welding. Since it was necessary to rigidify the welded frame, an angular reinforcing member was generally inserted in the ends of the rails prior to the welding operation and, in some instances, the weld was made through this member. Attention in the past has been directed more particularly to improvements in methods for assembling a plurality of rails into frame form and to reinforcing the abutting corners of the rails than to any change or improvement in the rail structure per se. It may have been contemplated that non-severing V-shaped cuts could be made in a section of metallic tubing which would permit bending the tube into frame form and welding only at the abutting ends, but this structure was never resorted to in view of the difficulty in producing accurate cuts. Attempts were made to saw out non-severing V-shaped openings in a metallic tube, but it was found that rough edges remained which, when smoothed down by filing, were so inaccurate that the adjacent edges of the cut portion of the rail would not accurately align and form a smooth joint. It is evident that it is more costly to assembly four mitered tubular elements into a rigid and substantially non-distortable frame than it is to provide non-severing mitered cuts in a tube and bend it into frame shape, provided, of course, that the cuts can be so made as to overcome the above mentioned objections. It is apparent that the fewer the welds necessary to assemble a tubular frame, fewer blemishes will occur in the exposed surfaces. Inasmuch as metallic screen frames are generally more expensive to produce than wooden screen frames and have only the slight advantage of increased screen area and visibility, it has become necessary for the metallic screen manufacturer to find less costly methods of producing metallic screen frames.

The present invention is directed to a screen frame structure and a method of producing the same. A frame made in accordance with the present invention is formed from a single section of metallic tubing instead of four separate rails. The single section of metallic tubing is subjected to a punching or cutting operation which produces several non-severing V-shaped notches therein. The cut edges of the notch are smooth and when the tubing is bent into frame form, these edges readily abut and accurately align to provide a smooth and finished mitered joint.

One of the objects of the invention, therefore, lies in the provision of a metallic screen frame comprised of a single section of tubular stock.

Another object of the invention lies in the provision of a metallic screen frame of a construction which eliminates much of the welding necessary in frames of this class formed from several rail elements.

Another object of the invention lies in the method of forming cut out portions in a section of metallic tubing for the purpose of providing a metallic screen frame formed from a single section of tubular stock. Another object of the invention lies in the provision of a metallic screen frame which, being formed from a single section of tubular stock may be produced at a substantially lower cost than a frame of the same class formed from several sections of stock.

Other and further objects and advantages of the invention will be more fully understood from a consideration of the following specification taken in conjunction with the accompanying drawings and in which Fig. 1 is a front elevation of a corner of a finished screen frame embodying one form of the invention;

Fig. 4 is a vertical sectional view of the tubing in a die preparatory to a mitered cut being made therein;

Fig. 5 is a plan view, partly in section, taken on the line 5—5 of Fig. 4;

Fig. 6 is a vertical sectional view similar to Fig. 4 showing the die in cutting position;

Fig. 7 is a fragmentary view of the tubing subsequent to being cut;

Figs. 8 and 9 show the steps of straightening the deformity of the cut edges of the tubing;

Fig. 10 is a view of the tubing after the edges of the cut have been straightened;

Figure 1:
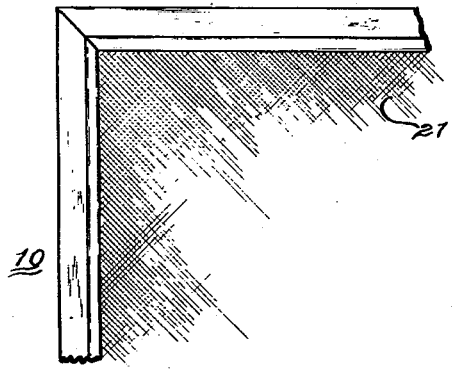
Figure 2:
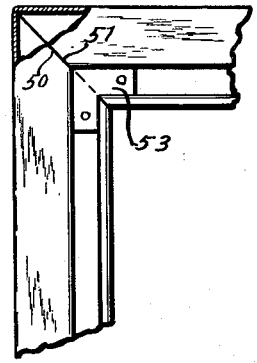
Fig. 2 is an enlarged elevation of a finished corner of a screen frame, parts being broken away to disclose details of the structure.

Reference is now had to the drawings in which is shown a metallic screen frame generally indicated by the reference numeral 10. This frame includes four rails which are bent into rectangular frame form subsequent to having non-severing mitered cuts made therein. Since the mitered cuts do not completely sever the tube, the rails of the frame are integrally connected. The ends of the tube, of course, are mitered and must be accurately abutted and secured. The other three corners of the frame are easily formed because of the integral connecting wall. The metallic tube shown in the drawings is formed with a base wall 11. From the wall 11 a side wall 12 projects which together with walls 13 and 14 form a closed channel 15. The channel 15, as shown, is approximately half the width of the base wall 11 and, therefore, a further wall 16 abuts a portion of the base wall. The wall 16 continues in a further wall 17, which latter wall rests upon a wall 18 formed along the other edge of the base wall 11. A flange 19 is doubled back upon the free edge of wall 17 and secures walls 17 and 18 against relative displacement. It will be noted that walls 14, 16, and 17 form an open channel 20 in which a suitable rod or channel member may be fitted for the purpose of anchoring the edge of a section of wire cloth 21.

Inasmuch as it has heretofore been considered commercially impractical to form a screen frame from a plurality of integrally joined rails which have been sawed or otherwise cut to provide a miter joint, and the present invention is directed to a one piece frame and method of producing the same, attention is now directed to Figure 4 of the drawings wherein is shown a fragmentary portion of the base of a press generally indicated by the reference numeral 25. Mounted in the base of the press is a die 26 which comprises a rectangular member 27 having a central transverse opening 28. In the upper portion of the wall 29 of the opening a shallow set back or ledge 30 is provided. In the opposite wall 32 of the opening a recess 33 is made. In the base wall 34 of this recess is an opening 35, from which projects a coiled spring 36. Arranged transversely of the opening 33 is a pin 38 to which pivotally mounts a member 39 that extends into the opening 28 and terminates in an upstanding finger 40. Directly above the member 39 is a horizontally disposed rod 42 which terminates in a slightly enlarged head 43. The head 43 is somewhat bevelled or rounded at its end and is laterally movable under conditions hereinafter set forth. Directly above the opening 28 is a cutting tool 45 which, as shown in Fig. 5 of the drawings, is generally triangular in shape and is formed with a point 46. From the point 46 the tool is inclined laterally, being formed with cutting edges 47 and 48. The long face of the tool is recessed as at 49 to clear the cut out portion of stock.

Figure 3:
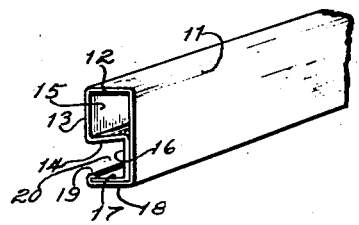
Fig. 3 is a view showing the shape of the metallic tube in cross section.
Figure 11:
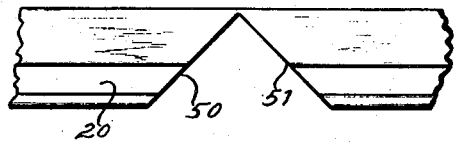
Fig. 11 is a plan view of the section of tubing shown in Fig. 10.
Figure 12:
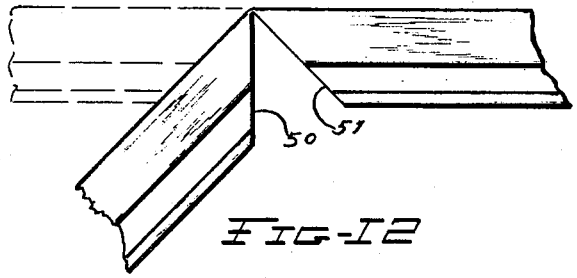
Fig. 12 shows the tubing being bent into frame form.

When it is desired to form a frame from a section of metallic tubing heretofore described and shown in Figure 3 of the drawings, said tubing is moved into the press 25 along a recess provided therefor so that a portion of the tubing rests on the ledge formed by the set back 30 in the wall 29 of the opening 28. It is to be noted that the width of the ledge is approximately the thickness of tube wall 12. The cutting tool 45 being above the tubing, is downwardly movable by operation of a suitable trip or release of the press. As the tool 45 moves downwardly, the point 46 thereof contacts wall 13 of the tube immediately adjacent wall 12. As the tool continues downwardly the inclined cutting surfaces 47 and 48 sever wall 13 and, upon completion of the downward movement (see Figure 6), the tube is formed with a V-shaped cut which has severed all but the wall 12. During the process of cutting the tube a certain amount of deformity occurs adjacent the cut and particularly in walls 13 and 14. The general contour of the cut edges of the tube after the cutting operation are shown in Figure 7 of the drawings. As the tool 45 moves upwardly from the position of Figure 6 to that of Figure 4 a mechanism automatically operates to move rod 42 laterally into the opening 28. This rod is disposed centrally of the cut out portion of the tube. As the rod moves laterally it strikes the finger 40 of the member 39, depressing said finger against the tension of spring 36. If by chance the cut out portion has not entirely cleared, finger 40 strikes this portion and moves it downwardly substantially as indicated in Figure 8 and assures unobstructed passage for the head 43 of rod 42 to move into the cut opening and straighten or return walls 13 to their original shape substantially as shown in Figure 10.

Attention is directed to the fact that because the cutting tool 45 has symmetrical cutting surfaces 47 and 48, edges 50 and 51 of the V-shaped cut in the tube are identical. Thus, when the tube is bent into frame form, the connecting wall 12 thereof causes the cut edges 50 and 51 to perfectly align. When the tube has been bent into frame form a small corner piece 53 is inserted into the open channel 20 and secured in any suitable manner as by spot welding to the double thickness of the adjacent rails, namely, walls 11 and 16.

The majority of tubular screen frames to which this invention is applicable are rectangular and, therefore, formed with four rails. Thus, a section of tubing of any given length is formed with three cuts intermediate the ends which are mitered. The mitered ends of the tube may be secured in alignment with the corner piece 53, or in the case of a frame of comparatively large proportions, be fitted with a larger and more substantial corner piece.

Although applicant has shown and described only one type of tubular frame and a particular form of die and cutting tool for producing the frame, it will be understood by those skilled in the art that modifications of the structure and method herein shown and described may be made without departing from the spirit and scope of the invention insofar as such modifications are consistent with the hereunto annexed claims.

Having thus set forth my invention what I claim as new and for which I desire protection by Letters Patent is:

1. The method of making a screen frame from a metallic member of integral tube and channel cross section, consisting in simultaneously producing a severing cut-out in the channel and a non-severing cut-out in the tube, the cut-outs of the tube and channel together forming a wedge-shaped opening, bending the metallic member along the unsevered portion of the tube to bring the corresponding severed edges of both tube and channel into abutment, and securing the abutting edges together.

2. The method of forming a screen frame from a continuous metallic section of an integral rectangular tube and channel consisting in cutting out a wedge-shaped portion in the tube and channel without severing one straight wall of said tube; straightening the deformed edges of the opening thus formed; bending the unsevered wall of the section to cause the edges of the opening to abut; and securing together the meeting ends of said section.

3. The method of forming a screen frame from a single metallic section of an integral rectangular tube and channel consisting in cutting out a wedge-shaped portion in the tube and channel without severing one straight wall of the tube; straightening the deformed edges of the openings thus formed; mitering the ends of said section; bending the unsevered wall of the section to bring the edges of each opening and the mitered ends into abutment; and securing an angle piece in each corner of the frame thus formed.

4. The method of forming a frame from a single metallic section of an integral tube and channel, consisting in passing the section through a die in which a shearing tool produces wedge-shaped openings that sever all but one straight wall of the tube; bending the section along the unsevered straight wall to close the openings and bring said section into frame shape; and mitering and securing the abutting ends thereof.

5. The method of forming a frame from a single section of a combined tube and channel consisting in passing the section through a die in which a shearing tool produces wedge-shaped openings in all but one wall of the tube; straightening the deformed edges of the openings thus formed in the tube; bending the section along the unsevered wall into frame shape; and mitering and securing the abutting ends thereof.

ROLLAND M. STOWE.